US010047287B2

(12) United States Patent
Buckley

(10) Patent No.: US 10,047,287 B2
(45) Date of Patent: Aug. 14, 2018

(54) METHODS FOR MANUFACTURING GLOW IN-THE-DARK TARGETS

(71) Applicant: Douglas Buckley, Corona, CA (US)

(72) Inventor: Douglas Buckley, Corona, CA (US)

( * ) Notice: Subject to any disclaimer, the term of this patent is extended or adjusted under 35 U.S.C. 154(b) by 267 days.

(21) Appl. No.: 15/080,786

(22) Filed: Mar. 25, 2016

(65) Prior Publication Data
US 2017/0275530 A1 Sep. 28, 2017

(51) Int. Cl.
C09K 11/64 (2006.01)
C09D 11/037 (2014.01)
C09D 11/50 (2014.01)
B41M 3/06 (2006.01)
F41J 1/01 (2006.01)
F41J 5/14 (2006.01)
C09K 11/02 (2006.01)

(52) U.S. Cl.
CPC ............ C09K 11/643 (2013.01); B41M 3/06 (2013.01); C09D 11/037 (2013.01); C09D 11/50 (2013.01); C09K 11/02 (2013.01); F41J 1/01 (2013.01); F41J 5/14 (2013.01)

(58) Field of Classification Search
CPC ..... C09K 11/643; C09D 11/037; C09D 11/50; B41M 3/06; F41J 1/01; F41J 5/15; F41J 5/24
USPC ...... 106/31.14, 31.64; 273/378, 409; 434/23
See application file for complete search history.

(56) References Cited

U.S. PATENT DOCUMENTS

| 1,145,585 | A | | 7/1915 | Hebard |
| 1,175,692 | A | | 3/1916 | Boicourt |
| 2,568,279 | A | * | 9/1951 | Walkup ............... F21V 9/16 273/362 |
| 3,330,561 | A | | 7/1967 | Kandel |
| 3,353,827 | A | | 11/1967 | Dun, Jr. |
| 3,370,852 | A | | 2/1968 | Kandel |
| 3,423,092 | A | | 1/1969 | Kandel |
| 3,895,803 | A | | 7/1975 | Loe |
| 3,899,175 | A | | 8/1975 | Loe |

(Continued)

FOREIGN PATENT DOCUMENTS

CN           101251357 A  *  3/2008

OTHER PUBLICATIONS

English translation of CN 101251357, Mar. 2008; 9 pages.*

(Continued)

Primary Examiner — Helene Klemanski
(74) Attorney, Agent, or Firm — Kirk A. Buhler; Buhler & Associates

(57) ABSTRACT

Improvements in methods for manufacturing glow in-the-dark targets are disclosed. This provides an ink that produces images that will glow in the dark for an extended period of time after the ink has been exposed to natural or artificial light. This can be used for flexographic printing, offset printing, gravure printing, and screen printing applications. The ink includes a phosphorescent pigment and optionally includes a colorant on a substrate of paper, plastic or metal. The phosphorescent pigment material is not coated prior to mixing with other ink components. The pigment material has a particle diameter size of about 600 mesh to about 1500 mesh. The ink includes a colorant (optional), a thermoplastic resin binder, a charge-controlling agent, a release agent, as well as the phosphorescent pigment.

12 Claims, 3 Drawing Sheets

(56) References Cited

U.S. PATENT DOCUMENTS

Figure 1:
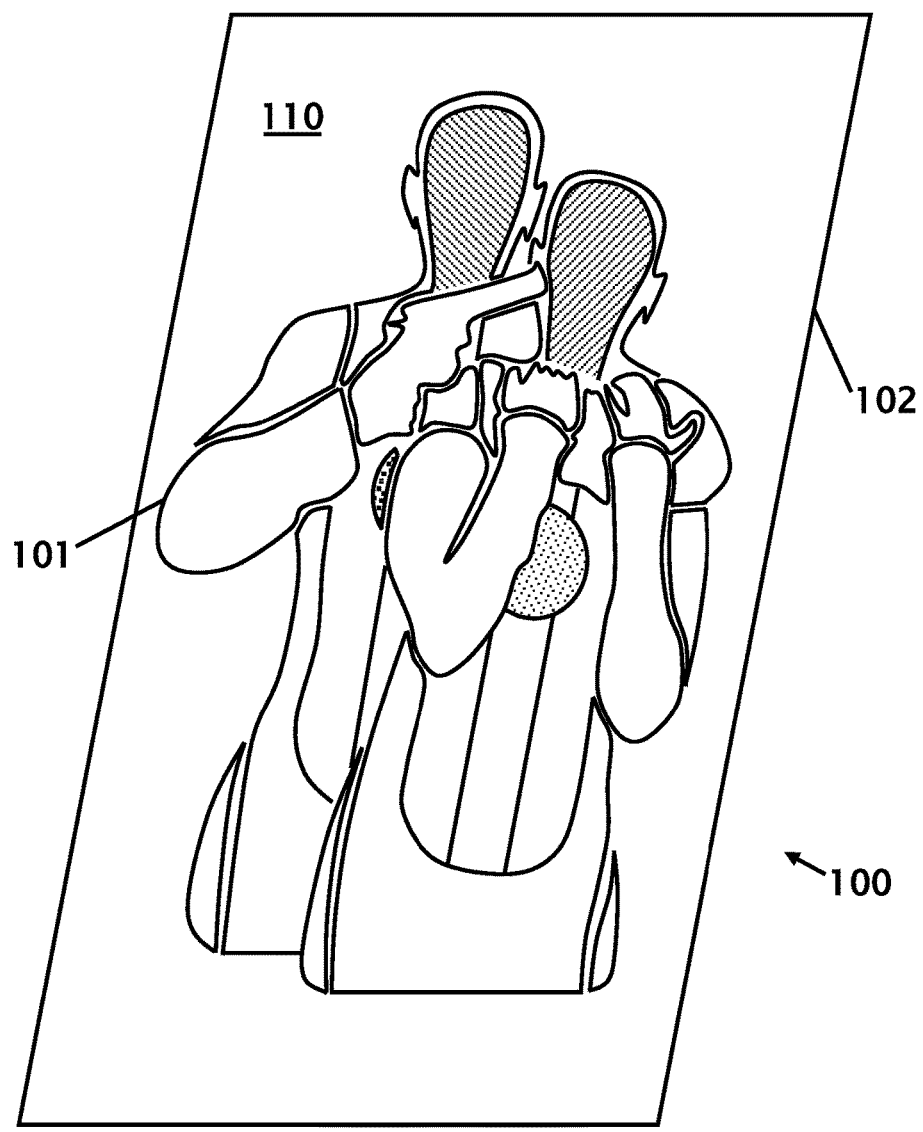

| | | | |
|---|---|---|---|
| 4,462,598 A | 7/1984 | Chalin et al. | |
| 4,921,256 A | 5/1990 | Gearhart | |
| 5,186,468 A | 2/1993 | Davies | |
| 5,188,371 A | 2/1993 | Edwards | |
| 5,275,890 A | 1/1994 | Wolf et al. | |
| 5,424,006 A * | 6/1995 | Murayama | C09K 11/7734 |
| | | | 252/301.4 R |
| 5,437,931 A | 8/1995 | Tsai et al. | |
| 5,501,467 A | 3/1996 | Kandel | |
| 5,580,063 A | 10/1996 | Edwards | |
| 5,676,401 A | 10/1997 | Witkowski et al. | |
| 5,686,022 A * | 11/1997 | Murayama | C09K 11/02 |
| | | | 252/301.4 R |
| 6,019,375 A | 2/2000 | West, Jr. | |
| 6,845,982 B2 | 1/2005 | Kirk et al. | |
| 7,427,365 B2 * | 9/2008 | Hirata | C09K 11/7792 |
| | | | 252/301.4 R |
| 7,631,877 B2 | 12/2009 | Zara | |
| 8,444,056 B2 | 5/2013 | Gamez et al. | |
| 8,556,268 B2 | 10/2013 | Su | |
| 8,596,643 B1 | 12/2013 | Edwards | |
| 9,170,077 B2 | 10/2015 | Johnson et al. | |
| 2004/0036221 A1 | 2/2004 | Martinez | |
| 2005/0160637 A1* | 7/2005 | Hesse | E04H 13/003 |
| | | | 40/124.5 |
| 2007/0046760 A1 | 3/2007 | Zara | |
| 2010/0330487 A1* | 12/2010 | Veregin | G03G 9/0808 |
| | | | 430/108.4 |
| 2012/0225739 A1* | 9/2012 | Cheshire | A63B 63/06 |
| | | | 273/378 |
| 2012/0292533 A1* | 11/2012 | Ben Shalom | B41M 5/284 |
| | | | 250/492.1 |
| 2013/0038020 A1 | 2/2013 | Davis, Jr. et al. | |
| 2014/0134574 A1* | 5/2014 | Yach | F41J 5/00 |
| | | | 434/22 |
| 2015/0137453 A1* | 5/2015 | Taylor | F41J 1/01 |
| | | | 273/362 |
| 2016/0258721 A1* | 9/2016 | Davis | F41J 1/01 |
| 2017/0227336 A1* | 8/2017 | Hosey | F41J 5/24 |

OTHER PUBLICATIONS

Glow in the Dark Target Information Sheet; https://flex-fletch.ecrater.com/p/8214053/glow-in-the-dark-targets, no date available; 2 pages.*

LumiNova Pigments; https://www.nemoto.co.jp/nlm/luminouspigment/use?lang=eng; 2015, no month available; 4 pages.*

LumiNova Products; http://www.tavcochem.com/pig_disp/luminova.htm, 2008, no month available; 3 pages.*

Glow-in-the-Dark-Vanes; http://www.bowhunting.net/artman/publish/NewProducts/New Glow-in-the-Dark-Vanes to Increase Visibility.shtml; Aug. 6, 2010; 3 pages.*

KryptoLight Targets; http://kryptolighttargets.com/product/kryptolight-target/; 2016, no. month available; 3 pages.*

KryptoLight Targets2; http://kryptolighttargets.com/product/kryptolight-target-2/; no. date available; 4 pages.*

* cited by examiner

METHODS FOR MANUFACTURING GLOW IN-THE-DARK TARGETS

CROSS REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in apparatus and methods for manufacturing glow in the dark pistol and rifle shooting targets. More particularly, the invention relates to an ink that includes phosphorescent material for producing a phosphorescent image on a substrate, to a device including the substrate and the ink, and to methods of forming and using the ink and the specific use for indoor and outdoor pistol and rifle shooting range targets.

Description of Related Art Including Information Disclosed Under 37 CFR 1.97 and 1.98

Ink-based shooting target imaging, such as flexographic printing, offset printing, gravure printing and screen printing transferring the image onto a substrate such as paper, plastic and metal or the like, and fusing the ink onto the substrate using heat, pressure, and/or a solvent.

Because poor lighting conditions makes pistol and rifle shooting targets difficult to see at long distances in most indoor shooting ranges, and virtually impossible for outdoor shooting ranges to see pistol and rifle shooting targets after dusk, it is necessary to create a shooting target that can self-illuminate in order that the shooting target can be visible to the shooter at long range distances where standard lighting conditions cannot illuminate the target well enough for the target shooter to gain target visibility.

A number of patents and or publications have been made to address these issues. Exemplary examples of patents and or publication that try to address this/these problem(s) are identified and discussed below.

United States Publication No. US2010/0330487, in the name of Veregin et al., dated Dec. 30, 2010, states that while commercial phosphorescent pigments exist, they are too large to be incorporated into ink particles and therefore it has not been possible to directly prepare phosphorescent electrophotographic prints. Veregin further states that both chemical and conventional ink processes currently available will fail to incorporate these large pigments. Veregin et al. purports to overcome this problem by coating the phosphorescent material, which is relatively time consuming and expensive.

U.S. Pat. No. 9,170,077 issued on Oct. 27, 2015 to Scott Johnson discloses a Shooting Target with Reactive Zones. The invention includes printed shooting targets having reactive zones and methods related to the same. In an embodiment, the invention includes a shooting target comprising a substrate. While this patent provides an enlarged identification area where the target has been struck, but the target is not visible in the dark and the penetration holes are only visible when the target has been struck.

For the foregoing reasons, improved methods and apparatus for manufacturing highly visible pistol and rifle shooting targets having a phosphorescent image using ink-based processing, which are relatively easy, inexpensive and desired.

What is needed is a method for manufacturing glow in-the-dark targets where the targets can be charged with sunlight or artificial light whereby the targets produce some light in darkness. The proposed methods for manufacturing glow in-the-dark targets provides the solution.

BRIEF SUMMARY OF THE INVENTION

The present invention provides an improved ink for producing phosphorescent images and improved methods of forming and using the ink. In addition to addressing the various drawbacks of the now-known inks and methods, in general, the invention provides an ink that produces images that will glow in the dark for an extended period of time after the ink has been exposed to natural or artificial light.

As set forth in more detail below, the ink and method described herein can be used for flexographic printing, offset printing, gravure printing, and screen printing applications.

In accordance with various embodiments of the invention, an ink includes a phosphorescent pigment and optionally includes a colorant.

In accordance with various aspects of these embodiments, the phosphorescent pigment material is not coated prior to mixing with other ink components.

In accordance with further aspects, the phosphorescent pigment material has a particle diameter size of about 600 mesh to about 1500 mesh.

In accordance with further aspects of these embodiments, the ink includes a colorant (optional), a thermoplastic resin binder, a charge-controlling agent, a release agent, as well as the phosphorescent pigment.

In accordance with additional embodiments of the invention, a method of forming an ink includes blending binder resin particles, mixing colorant particles (optional), charge-control agents, release agents, (uncoated) phosphorescent pigment, classifying the mixture, and blending the classified mixture with inorganic materials. Regardless of the technique, the ink, including an optional colorant and phosphorescent pigment, having a particle diameter size of about 600 mesh to about 1500 mesh can be formed without the step of forming a master batch or coating the phosphorescent material in a separate step.

In accordance with yet additional embodiments of the invention, a device includes a substrate (e.g., paper, plastic or metal) and a phosphorescent image printed using an ink. The phosphorescent image may appear colorless when no additional colorant is used, and creates a glow-in-the-dark image on the surface of the substrate. In accordance with various aspects of these embodiments, the device further includes a colorant on a surface of the substrate. The colorant may form part of the image or may form a distinct image.

Various objects, features, aspects, and advantages of the present methods for manufacturing glow in-the-dark targets will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 2:
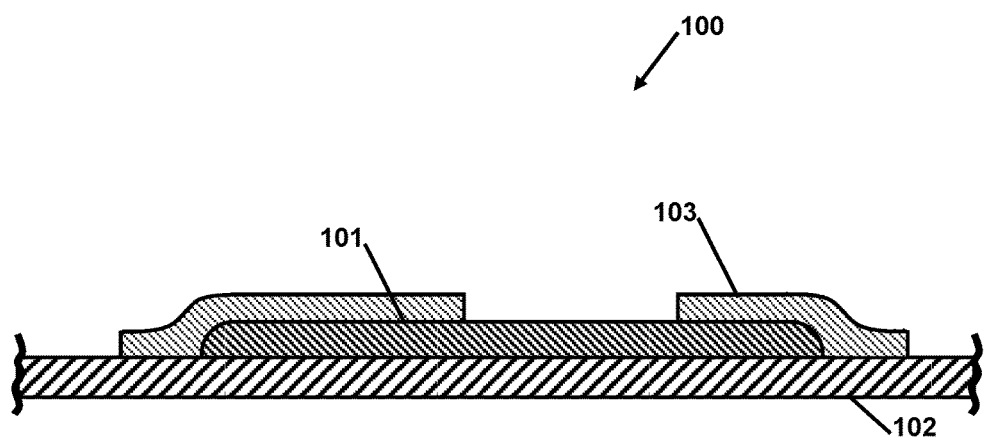
Figure 3:
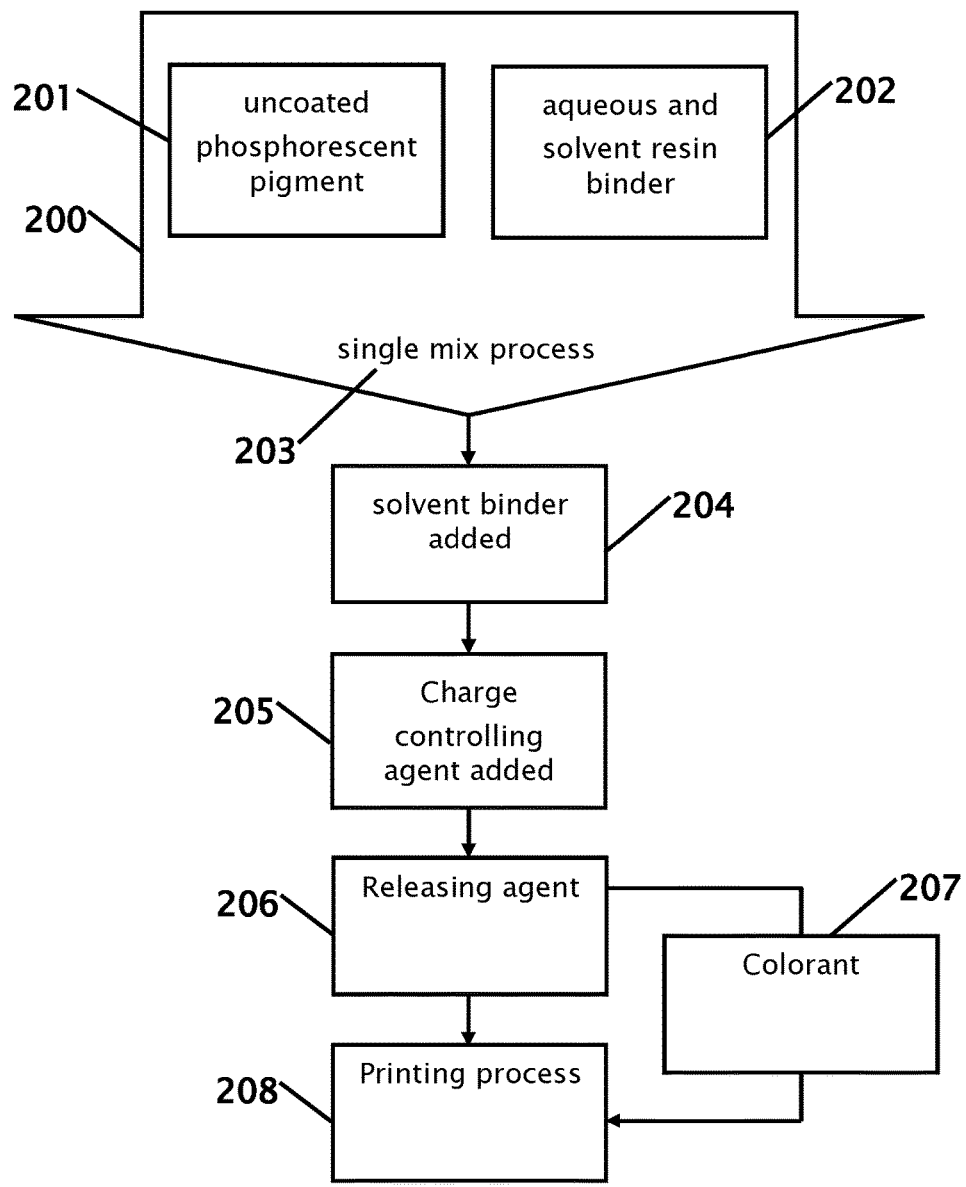

FIG. 1 shows a target 100, including an image 101 formed on a surface of a substrate
FIG. 2 shows a cross-sectional view of the printed target.
FIG. 3 shows a flow chart of making and printing the glow in-the-dark targets.

DETAILED DESCRIPTION OF THE INVENTION

The following description is provided to enable a person skilled in the art to make and use the invention and sets forth the best mode contemplated by the inventors of carrying out their invention. Various modifications to the description, however, will remain readily apparent to those skilled in the art, since the general principles of a phosphorescent ink for forming a glow-in-the-dark image and methods of forming and using the ink are defined herein.

FIG. 1 shows a target 100, including an image 101 formed on a surface of a substrate 102. As set forth in more detail below, image 101 contains phosphorescent pigment that when placed in natural or "artificial" light absorbs the light as a form of energy. This energy is then released as light when device 100 is placed in a dim light environment, such that the image glows in the dark for an extended period of time without external illumination.

In this figure It is contemplated that just the background 110 can include glow-in-the-dark phosphorescent pigment, the silhouette can be printed with glow-in-the-dark phosphorescent pigment, skin elements are printed with glow-in-the-dark phosphorescent pigment, or the vital target areas are printed with glow-in-the-dark phosphorescent pigment. It is further contemplated that different areas can be printed with glow-in-the-dark phosphorescent pigment, or that different overcoat printing are used to alter the intensity of illumination from different areas of the target.

The target images are printed with different ink colors including, but not limited to, pantone ink colors, process ink colors and the phosphorescent light emitting pigments.

It is contemplated that the front of the target can be nearly completely covered and the glow-in-the-dark phosphorescent pigment is charged by illuminating the rear portion of the target through the substrate 102. The phosphorescent pigment can be charged with sunlight or artificial illumination applied to the front, back or both sides of the target.

EXAMPLE

FIG. 2 shows a cross-sectional view of the printed target 100. The prepared mono-component ink 101 is printed on a substrate 102 such as a multipurpose 60 lb paper, a transparent image was formed using this ink. An overcoat or filtering image 103 is shown placed over a portion of the mono-component ink 101 whereby a different amount of illumination is visible from the coated and uncoated portions of the mono-component ink 101. While an overcoat 103 is shown the overcoat 103 can be removed to provide a single-pass printing operation.

When the printed image of the mono-component ink 101 is exposed to natural sun light for fifteen minutes, the mono-component ink 101 absorbs energy from the natural light.

When the printed image is mounted on a target clamp and sent down range in a low level light environment the printed image illuminates with a yellow, green, blue, or orange light in the dark. This yellow, green, blue or orange image was noticeable in the lower level lighting environment until the absorbed energy had dissipated. This process can be performed on a plastic and metal substrates. When an image of three rings is printed on the paper, plastic and metal substrates and the printed sample is mounted in target clamps and sent down range. The printed sample is essentially transparent in color in normal range lighting conditions. The image remains in normal range lighting until the target is sent down range. As the light down range dissipates, a light yellow, green, blue or orange glow of the three rings is visibly noticeable.

In this printing process of screen printing phosphorescent pigment is described as "Mesh", but can also be described as Microns. The larger the mesh, the greater the size of phosphorescent particulates can be screened onto the substrate. A typical ratio of Mesh to Microns is shown below herein.

600 Mesh=25 Microns.

1500 Mesh=10 Microns.

FIG. 3 shows a flow chart of making and printing the glow in-the-dark targets. In the preferred embodiment, the phosphorescent ink for producing a phosphorescent image on a substrate by a printing process, the phosphorescent ink is with a total amount of aqueous and solvent resin binder, an uncoated phosphorescent pigment for forming a phosphorescent image on the substrate. The uncoated phosphorescent pigment 201 is blended 200 with the total amount of the aqueous and solvent resin binder 202 in a single mix process. The single mix process 203 is micronized. The uncoated phosphorescent pigment can be one or more of alkaline earth aluminates and alkaline earth metal aluminate oxides and phosphors. The phosphorescent ink has an average particle size in the range of about 600 mesh to 1500 mesh.

The uncoated phosphorescent pigment is present in the range of about 18% to about 30% by weight. The aqueous and solvent resin binder 204 comprises a material selected from the group consisting of one or more of polyester resins, epoxy resins, latex-based resins, plant oil and bio-based polymer resins.

It is further contemplated that a charge-controlling agent can be used where the charge-controlling agent 205 is an organic pigment. The phosphorescent ink can also include a colorant 207 and or a releasing agent 206.

This printing technique is suited for a variety of different printing processes 208 including, but not limited to, flexographic printing, offset printing, gravure printing, screen printing and the like can be used.

Thus, specific embodiments of methods for manufacturing glow in-the-dark targets have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A method for manufacturing glow in-the-dark targets comprising:
   blending water and a solvent resin binder with an uncoated phosphorescent pigment in a single mix process;
   said uncoated phosphorescent pigment being a material selected from a group consisting of alkaline earth aluminates and alkaline earth metal aluminate oxides;
   micronizing said single mix process to obtain an average particle size in a range of between 600 mesh and 1500 mesh;
   adding additional solvent binder;
   adding a charge-controlling agent;
   adding a releasing agent to create a phosphorescent ink, and
   printing said phosphorescent ink on a paper or metal substrate.

2. The method according to claim 1, wherein said uncoated phosphorescent pigment is present in the range of 18% to 30% by weight.

3. The method according to claim 1, wherein said solvent resin binder comprises a material selected from the group consisting of one or more of polyester resins, epoxy resins, latex-based resins, plant oil and bio-based polymer resins.

4. The method according to claim 1, wherein the charge-controlling agent comprises an organic pigment.

5. The method according to claim 1, further comprising adding a colorant.

6. The method according to claim 1, wherein said phosphorescent ink is printed on said flexible substrate with flexographic printing, offset printing, or gravure printing.

7. The method according to claim 1, wherein said phosphorescent ink is colorless when no additional colorant is used.

8. The method according to claim 1, wherein said particle size of 600 mesh is 25 microns.

9. The method according to claim 1, wherein said particle size of 1500 mesh is 10 microns.

10. The method according to claim 1, wherein said phosphorescent ink illuminates with a yellow, green, blue, or orange image in the dark.

11. The method according to claim 1, wherein said phosphorescent pigment is charged with sunlight or with artificial illumination that is applied to the front, back or both sides of said target.

12. The method according to claim 1, wherein said printing is a plurality of rings.

* * * * *